(12) United States Patent
Bromley

(10) Patent No.: US 12,484,894 B2
(45) Date of Patent: Dec. 2, 2025

(54) INTEGRATED CLOSURE DEVICE

(71) Applicant: Robert Lee Bromley, El Paso, TX (US)

(72) Inventor: Robert Lee Bromley, El Paso, TX (US)

(*) Notice: Subject to any disclaimer, the term of this patent is extended or adjusted under 35 U.S.C. 154(b) by 384 days.

(21) Appl. No.: 17/803,652

(22) Filed: Oct. 11, 2022

(65) Prior Publication Data

US 2024/0115257 A1    Apr. 11, 2024

(51) Int. Cl.
*A61B 17/04*    (2006.01)

(52) U.S. Cl.
CPC ...... *A61B 17/0469* (2013.01); *A61B 17/0482* (2013.01)

(58) Field of Classification Search
CPC ............ A61B 17/0469; A61B 17/0482; A61B 2017/00663; A61B 17/0057; A61B 2017/00637; A61B 2017/0472; A61B 2017/047; A61B 17/0401; A61B 17/0485; A61B 2017/06042; A61B 17/0483; A61B 2017/0496; A61B 17/0491; A61B 2017/0477; A61B 17/06166; A61B 17/3403

See application file for complete search history.

(56) References Cited

U.S. PATENT DOCUMENTS

| | | | | |
|---|---|---|---|---|
| 10,307,144 | B2 * | 6/2019 | Wu | A61B 17/0482 |
| 10,426,449 | B2 * | 10/2019 | Fortson | A61B 17/0057 |
| 12,035,905 | B2 * | 7/2024 | Wiebe | A61B 17/0469 |
| 2006/0069397 | A1 * | 3/2006 | Nobles | A61B 17/0057 606/144 |
| 2009/0281555 | A1 * | 11/2009 | Stone | A61B 17/0469 606/144 |
| 2012/0296373 | A1 * | 11/2012 | Roorda | A61B 17/0057 606/213 |
| 2013/0035702 | A1 * | 2/2013 | Heneveld | A61B 17/0482 606/144 |
| 2013/0165956 | A1 * | 6/2013 | Sherts | A61B 17/0482 606/148 |
| 2013/0253543 | A1 * | 9/2013 | Heneveld | A61B 17/0057 606/148 |
| 2013/0310856 | A1 * | 11/2013 | Sherts | A61B 50/30 606/148 |
| 2015/0157316 | A1 * | 6/2015 | Labarbera | A61B 17/0491 606/144 |

FOREIGN PATENT DOCUMENTS

| | | | |
|---|---|---|---|
| CN | 107811664 A | * | 3/2018 |
| KR | 20190040976 A | * | 4/2019 |

* cited by examiner

*Primary Examiner* — Katherine Shi

(57) ABSTRACT

A novel integrated wound closure device for laparoscopy having an elongated body with a distal end and proximal end able to-use suture for closing surgical port wounds comprising a single sequential proximal activation means able to operate multiple internal systems sequentially such as: a distal anchoring system, a self-contained tissue piercing system, a suture staging means to position suture suitable for capture at a target zone, and a suture capturing system to capture and retract suture into said piercing system with all system functions configured internally of said elongated body which can be reused multiple times per patient.

5 Claims, 16 Drawing Sheets

INTEGRATED CLOSURE DEVICE

BACKGROUND OF INVENTION

Prior art involves many methods of laparoscopic wound closure. For many years a small suture guide device having at least two guide channels, but not limited to two guide channels, originating from a large proximal end, and exiting at an angle on a tapered shaft. Said device was inserted into the surgical wound created by a trocar. When the trocar is removed the wound will need to be closed with suture. Said small device has a tapered shaft compatible for the size of the trocar used. Said device is inserted into the wound until said large proximal end is in contact with the abdomen which sets the correct depth of said device. The surgeon will use a small grasper having a means to hold suture and a sharp distal end to pierce the patient tissue. Said grasper will hold suture as it is inserted into a first guide channel. Said guide channel aides in placing suture at the correct position to properly pierce the peritoneum. After properly piercing said peritoneum and placing said suture the surgeon will release the suture and withdraw said grasper. Using a second guide channel said grasper is inserted and the grasper is oriented to capture the dangling suture inside the body cavity previously placed. Upon capture of said suture said surgeon will pull said suture back through said second guide channel and withdraw said grasper. Said suture is of sufficient length to have suture ends exposed and available for said surgeon to tie said suture and close the wound. Said suture guide had a single purpose of guiding suture placement, made as a single component usually of plastic or stainless steel. There were no moving parts or additional functions in this prior art.

This embodiment will be concerned with devices that have at least two or more combined functions used for wound closure. For those skilled in the art, it is well understood that single function devices known as guides are used in cooperation with a separate and non-integral suture grasper having a sharp distal end for piercing tissue and grasping suture.

A popular prior art wound closure device is comprised of two distinct components: an elongated body in the shape of a shaft having internal acute angled guide channels with a distal end having an anchoring means involving pivoting members that contract and expand when the proximal end is operated from a natural first position to a second position and back again. Said proximal end is usually spring loaded to return said proximal end back to a first natural position. The purpose of said pivoting members prevents removal of said wound closure device from within the body cavity by the geometry change of said anchoring means usually forming a triangular shape when expanded and a cylindrical shape matching said elongated body when contracted.

An external and separate suture grasping device has a piercing distal end commonly constructed to have a suture grasping means. Said piercing distal end can be constructed in a means such as a distal end jaw configuration that opens and closes to hold or release suture. Another prior art suture grasper has a distal piercing point, similar to a hypodermic needle, having stored inside a dual end flexible metal wire to facilitate retracting or extending from said distal piercing point. Said internal metal wire may have different end configurations designed to capture and release suture. Said suture grasping device is external of said wound closure device and enters the body through said acute angled guide channels.

An additional prior art method involves the above configuration but having two curved needles integral to said anchoring means attached at the distal end of the elongated shaft. Said curved needles have suture affixed to them. Said curved needles are held in place at said anchoring means and the excess suture length between said needles is placed in a groove retaining the loop of suture along said elongated body. Said anchoring means is slimmed to allow insertion into the patient wound. Said curved needles are sized so the arc of the needle is confined within the diameter of said elongated shaft and penetrate the peritoneum upward from the distal end of said wound closure device through the peritoneum. As the curved needles complete their circular travel they are stored within said elongated body for removal.

The embodiment of this novel integrated wound closure invention combining multiple functions into a single elongated device with a single proximal sequential selective means to operate internal said multiple functions. The details of which will be clearly itemized in the drawing descriptions.

SUMMARY OF THE INVENTION

A novel invention for a laparoscopic wound closure device able to use suture comprising: an elongated body having a distal anchoring system with grooved pathways to assist routing suture at a target location. Located proximally on said device is a single activator using repeatable movements to sequentially operate separate internal functions necessary to close a surgical wound. A first function allows an anchoring system entry to a wound and contact surgical position at the peritoneum. A second function uses a piercing system having straight internal-rigid hollow needles to pierce the peritoneum stopping at a suture target location. A third function extends a grasper hook from within said hollow needles to capture said suture. A fourth function retracts said grasper hook and captured suture into said hollow needles which retract from said peritoneum into said device. A fifth function closes said anchor system allowing said wound closure device to be withdrawn as said suture slips free from a pinch ring while exiting said wound and set aside. A sixth function returns said anchor system back to a normal open configuration. A surgeon may tie a knot and close the wound. Said wound closure device may be re-used multiple times.

DETAILED DESCRIPTION OF DRAWINGS

Figure 1:
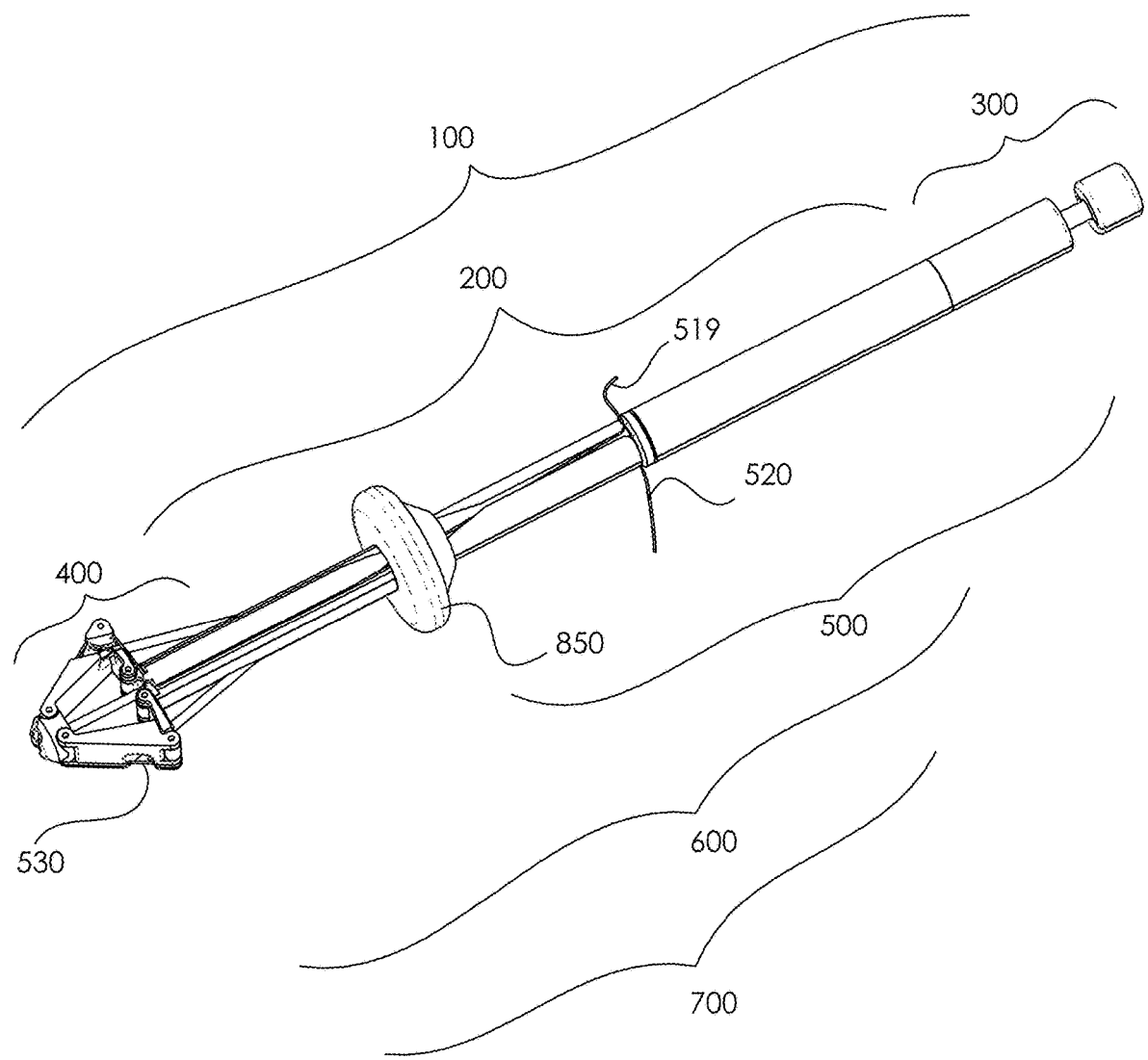
FIG. 1 is an overall view of the systems included in this novel invention.

The following drawings will depict and illustrate one means of construction for this novel integrated closure device but those skilled in the art can readily understand that the construction shown is used to portray the functional details of this embodiment and not necessarily reflect the actual shape and assembly of production components.

Said novel invention called an integrated closure device 100 combines four distinct systems, 300, 400, 600, 700, into said device 100 which are operable by the surgeon during wound closure. Each system will be described in detail after the overall description of said device 100. Said device 100 facilitates suture loading by a sterile field technician using off the shelf suture and staging said suture onto said device 100. The proximal end has a selective system 300 for a first downward movement which extends and closes the distal anchoring system 400 from a normally open position, and a suture management system 500 for routing and holding suture. After loading suture, the sterile field technician will then hand-off said device 100 to a surgeon to insert said device 100 into the wound. The first downward movement of the selective system 300 closes the anchoring system 400 to allow contact with the peritoneum setting the correct surgical depth. The beginning portion of the second downward movement of the selective system 300 extends the piercing system 600 out the guide channels 120 through the peritoneum until reaching a stop, the remaining portion of the second downward movement extends the grasper system 700 beyond said piercing system 600 to capture the suture at the target location. Upon release of said proximal end selective system 300 a spring 331 returns said grasper system 700 into said piercing system 600. A grasper hook 712 is drawn inside the sharp distal end 626 until finally the sharp distal opening 614, 615, until finally the sharp distal opening 614, 615, returns to the stowed position in the distal channel 220. Prior to closing the anchoring system 400 the pinch ring 562 is opened to release the suture tails. The third downward movement of the proximal selective system 300 closes the anchoring system 400 and the device 100 is withdrawn from the bringing the suture ends out of the wound leaving the suture ends on the patient's abdomen. Said suture ends are free of the pinch ring 562 as said device 100 is moved away from the wound. Said free suture ends are then tied by the surgeon to close the wound.

Said invention has a first sequential selector system 300 which selectively operates three discrete functions 400, 600, 700, in an orderly manner by rotating depressing a proximal button 311 multiple times to index 60-degrees on each full stroke down of 30-degrees and 30-degrees up. Said first functional means called an anchoring system 400 prevents the removal of said device 100 from the patient peritoneum. Said second functional means called a piercing system 600 has sharp hollow distal ends 610, 611, similar to a rigid hypodermic needle for piercing and retracting from said peritoneum. Said third functional means, called a grasping system 700 is a flexible wire hook-710, 711, which extends beyond said sharp hollow distal opening 614, 615, ramping over said suture span 521, 522, to engage said suture 530 at the target location gap 463, 424, and retracting said suture 530 into said sharp hollow distal opening 614, 615.

Said device 100 is first operated by said sterile technician. To begin, said device 100 is removed from a sterile pouch. Said device is in a normal state with said anchoring system 400 open. The first step is to depress the sequential selective system 300 plunger button 310 which rotates a shaft 330 in 30-degree increments as it moves downward to close the anchor system wings. As said plunger button 310 is depressed said plunger 330 having a ramp 334 causes rotation by 30-degrees upon contact with a distal ramp 346. Upon release of said plunger button 310 said plunger ramp 336 strikes a lead surface 347 to cause an additional 30-degree rotation, placing said plunger ramp 336 against a lead surface 347 to open said anchoring system 400. The sterile technician will acquire some suture from a storage cabinet and remove it from the holder and if equipped will detach a needle. Said sterile technician holding the suture ends in one hand whereby two vertical strands forming a loop when draped. Said device 100 having a trough 434 on said distal nose 430 is placed against the suture loop allowing said suture to nest in said trough 434 of distal nose 430. Said sterile technician routes one suture strand into the lower wing 420 grooves 422 straddling an open window span 424, around and upward into the upper wing 410 grooves 412 straddling an open window span 414, then under the distal nose 213, feeding one strand into the suture track 215 and suture guide 217 to be finally pulled into a pinch gap 219 for suture end retention. The suture 530 has a length, and the midpoint of said length is placed at trough 434. A first leg traces a staging path 435, 437, while a second leg traces 436, 438, along a pivot axis' allowing suture to maintain a near zero length change when the anchoring system 400 is open or closed. The alternate suture strand is staged in an identical fashion albeit on the opposite lower wing 421, upper wing 411, tab 113, suture track 115, and finally pulled into a pinch gap 219. With the anchoring system 400 retained in the closed condition and suture secured by the pinch gap 219, said device 100 with staged suture 530 is handed to the surgeon During a laparoscopic surgical procedure said device 100 is used to close surgical wounds created by laparoscopic trocar devices. If the trocar is an 8 mm trocar it will leave a wound slightly larger than 8 mm; therefore, said integrated closure device 100 will be sized to correspond to the wound diameter whether 8 mm by this example or some other size. The surgeon usually removes the trocar from the wound and then inserts the integrated closure device 100 to begin the process of closing a wound. Said integrated closure device can be reloaded and reused multiple times per patient.

Since suture 530 is not part of this novel invention however it is used by this novel invention 100 which can be pre-loaded and prepackaged at the time of use by a sterile field technician before the surgeon carefully plunges said device 100 into the patient wound until reaching the desired depth. The surgeon depresses the swiveling plunger button 310, 311, causing selector tabs 332 to abut proximal driver ends 452 protruding through a opening 782 in said collar 780 downward as the shaft 330 rotates 30-degrees at the end of stroke closing said anchoring system 400. Upon release of the plunger button 310 a spring 468 returns said anchoring system 400 to a triangular shape whereby the wings 410, 411, are pulled into contact with the peritoneum. Said anchoring system 400 is held in the normally open position by the spring 468.

After said anchoring system 400 is open, said piercing system 600 is ready to pierce said peritoneum. Depressing said selector button 310 which is swivel connected to plunger 333 allows said selector tabs 332 to push a shelf 784 on the non-rotatable selector collar 780 downward. The piercing system 600 includes said pusher 640 having proximally attached needle shafts 622, 623, a flex section 624, 625, and rigid distal end 626. Said rigid distal end 626, 627, is retained in said distal guide channels 220 having a bend 452 and straight run 454. Said sharp distal ends 614, 615, is stored within the distal guide channels 220, 221. Said sharp distal ends have a hypodermic style pierce point 616, 617, having an angled opening with the apex opening positioned so as not to expose the pierce point 616, 617, when retracted. Said selector collar 780 having two 120-degree collar openings 782 for operating said anchoring system 400, and two 60-degree collar shelves 784 for operating piercing system 600 and grasper system 700 sequentially. Said second downward pressure of said selector tabs 332 on the first 30-degrees of said 60-degrees of collar shelf 784 activates the piercing and grasping systems 600, 700, in succession on said second downward stroke. When said selector tabs 332 contact said collar shelf 784 a beginning downward stroke via spring 750 moves pusher actuator 740 to compress spring 650 and drives said collar 780 and 640 along with attached sharp distal ends 610, 611, via needle shafts 622, 623, through the peritoneum passed the open window span 465, 414, of the upper wing 410, 411, until said collar 780 hits a stroke stop 646. Continuing said downward stroke on the selector button 310 compresses the grasper spring 750 extending the grasper system 700 wire hook 710, 711. Said grasper system 700 exiting said distal opening 614, 615, allows the stored distal hook 712, 713, angular leg 714, 715, to change shape from a stored compact angle to an angled hook shape which allows said hook 712, 713, to pass up to said staged suture 530 spanning said open window 463, 424, until said angular leg 714, 715, first touches said suture 530 at a mid-contact point and then due to the distal hook ramp 712, 713, subdues the suture 530 downward passed the hook tip 702, 703, to be received in the angled hook gap 718, 719. Upon capture of the suture 530 reversing said downward pressure by the selector by spring 331 ending stroke said hook 712 captured suture 530, retracts said suture 530 and grasper system 700 via spring 750 into said sharp distal opening 614, 615, upon which the upward stroke of selector 330 retracts the distal end 626, 627. For suture to retract into said sharp distal end 615 of said needle 610, 611, the additional suture length is drawn from the suture ends within grooves slipping through the pinch gap 512 as tension is created by a pinch ring 562 and pinch spring 560. To withdraw the device 100 from the patient wound the selector 330 is depressed indexing said selector tabs 332 by 60-degrees to contact two leg ends 466 and close the anchor system.

FIG. 1 is an overall view of the functional systems, 300, 400, 500, 600, 700, integrated in this novel invention 100 comprised of an elongated body 200 a proximal selective function means 300, a distal anchoring means 400, suture management system 500, and internal needle piercing means 600, and a suture grasping means 700.

Figure 2:
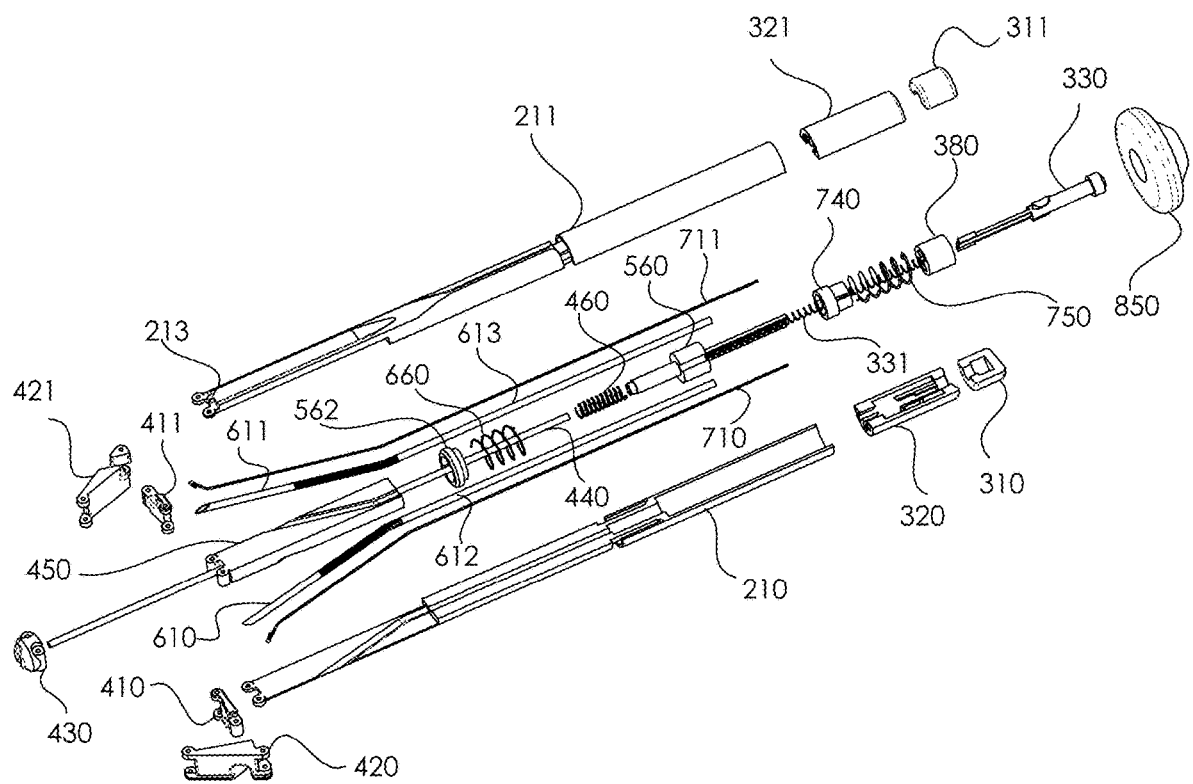
FIG. 2 is an exploded view of the components comprised therein said novel invention.

FIG. 2 is an exploded view of said device 100 with components comprised therein of said novel invention showing said elongated body 210, 211, a central distal end 450, the proximal sequential selective system 300 is explained in further detail. Said proximal sequential selective system 300 is comprised of a shaft 330, thumb operated, vertically aligned, but freely rotating having proximal button halves 310, 311. Said shaft 330 is constrained within the two indexing halves 340, that allow the shaft 330 to rotate 360-degrees in 60-degree increments from 30-degrees down to 30-degrees up. Said shaft 330 first downward movement contacts said driver 460, attached to rod 440 and end cap 430 which is in line with said pusher 640 and collar 780, in a stack to operate said anchoring system 400 lower wings 420, 421, and upper wings 410, 411. Upon releasing said button halves 310, 311, shaft spring 331 and anchor spring 468 reopens said anchoring system 400. Said shaft 330 can also push collar 780 to move the piercing system 600 via the said grasper spring 750 contacting the said pusher 640. Said grasper spring 750 has sufficient force compressing needle spring 650, to cause the said pusher 640 with attached flexible tubes 612, 613, to move said rigid hollow needles 610, 611, to pierce said peritoneum until stopping against said driver 460. Upon stopping said shaft 330 continues to depress said grasper spring 750 until said grasper system 700 flexible wire 710, 711, extends beyond said sharp distal end 610, 611, able to capture suture. Releasing said button 310, 311, allows said shaft 330 to return due to said grasper spring 750 and shaft spring 331 reversing said movements of said grasper wires first and said needles second to retract captured suture. Finally, suture is released by opening pinch ring 562 compressing pinch spring 560 before depressing said shaft 330 to contact said driver legs 462, to move said driver 460, rod 440, end cap 430 and compress said anchor spring 468 closing said anchoring system 400 for wound removal.

Figure 3:
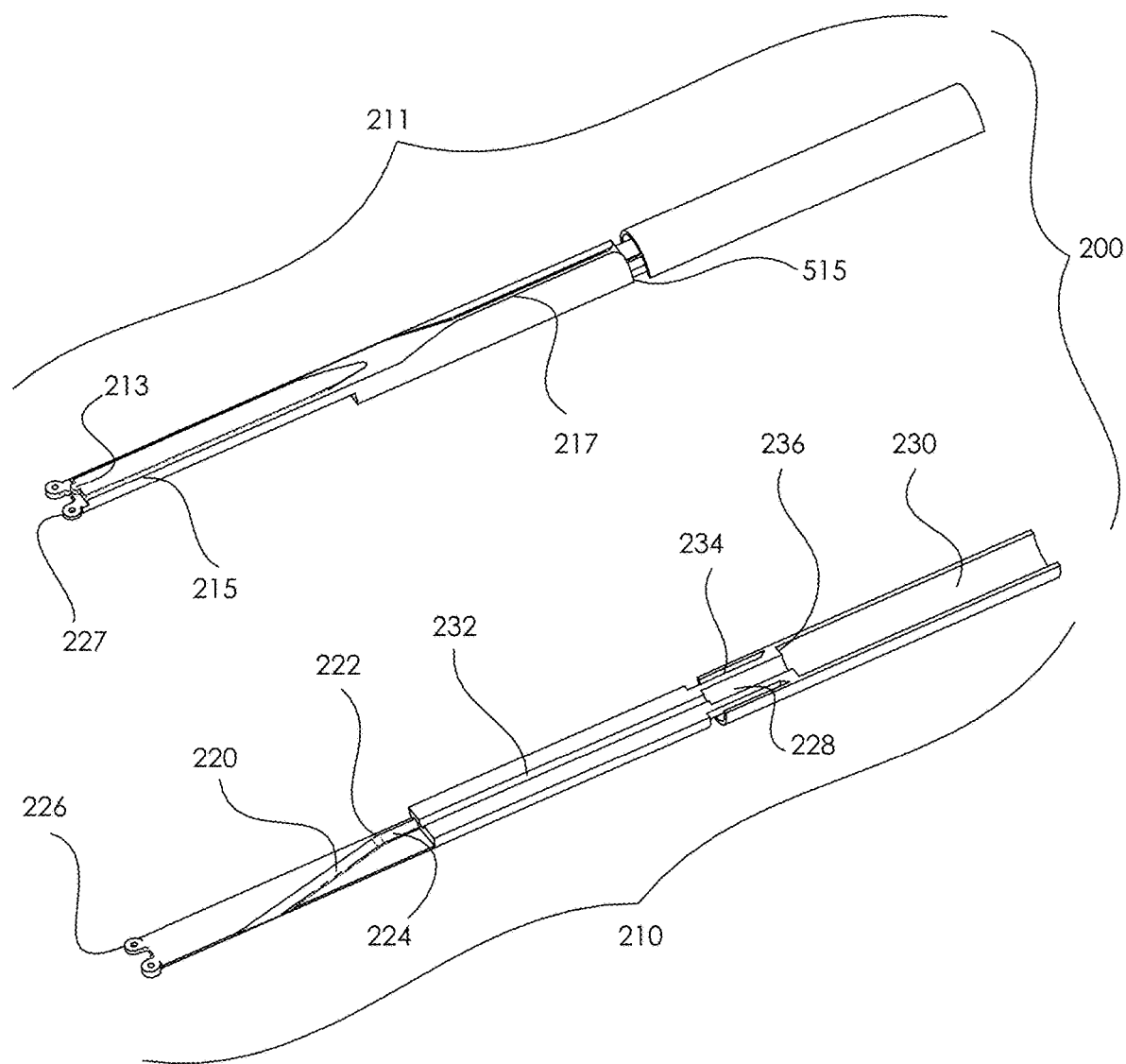
FIG. 3 is an isometric view of the novel invention showing the main body halves.

FIG. 3 is an isometric view of said novel invention showing the device 100 having a main body halves 210, 211, comprised in group 200. The body halves 210, 211, are functionally and rotationally symmetrical. Said upper half 211, shows exterior features such as distal tab 213 between the hinge means 227, respectively shown as knuckles using a hinge pin but those skilled in the art can imagine the hinge means being a living hinge or snap-in knuckle without a pin, and a suture track 215 leading to the suture guide 217 ending at the suture pinch gap 219. Said lower half 210 having hinge means 226, shows the interior features of a guide channel 220, a bend 222, and straight channel 224. There is a center channel 232 a spring recess 234, a spring pocket 228, a shoulder 236 and main cavity 230.

Figure 4:
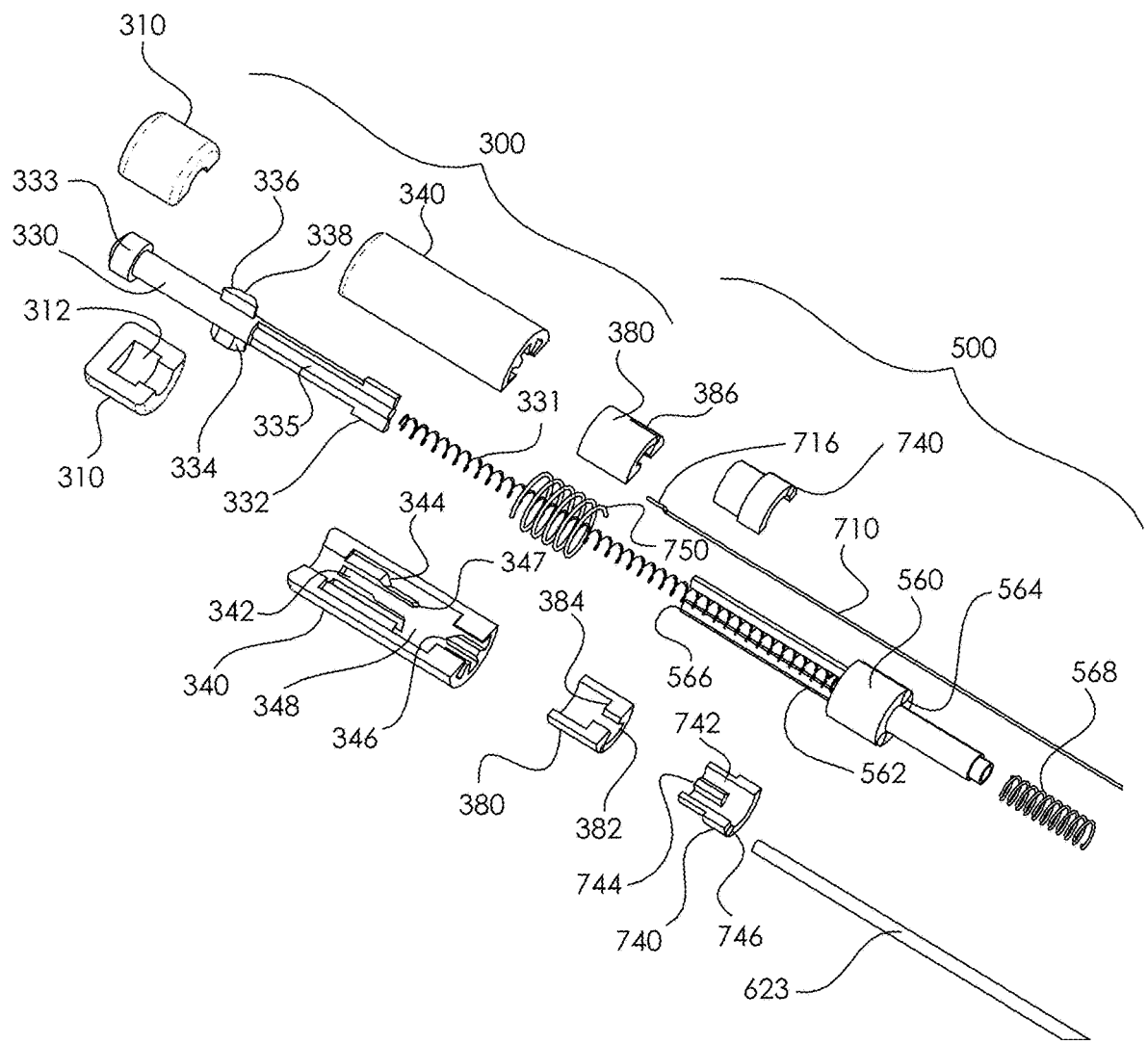
FIG. 4 is an exploded view of the proximally located selector system.

FIG. 4 is an exploded view of said selector system means 300 showing a split button 310, 311 for clarity of an interior cavity 312 to encapsulate vertically but not limit rotation on a shaft head 333. A shaft 330 having two opposing distal tabs 332 emanating from the shaft axis forming a pie shape 30-degrees in size, which selectively operate functions in each of three segments, each segment is 60-degrees, by incrementing 30-degrees in the downward direction and 30-degrees in the upward direction before repeating. Each distal tab 332 rotates 180-degrees after three operations. A first operation begins by depressing said shaft 330 via said button 310, 311. Near a mid-point of said shaft 330 are two opposing facing fins 338 emanating from the shaft axis forming a pie shape at 30-degrees in size, on the same plane as said distal tabs 332. Said fins 338 having a trapezoidal shape due to distal ramps 334 and proximal ramps 336. Interior of said housing 340 is shown split for clarity having a total of six proximal lugs 342 and six distal lugs 349, said lugs are offset so as not to be above one another. Each of said lugs 342, 349, have ramps. Proximal lugs 342 have proximal lug ramps 344 adjacent to a fence ramp 347 which interact with proximal fin ramps 336, while six distal lugs 349 have distal ramps 346 which interact with said distal fin ramps 334. Each downward movement rotates said shaft 330 clockwise by 30-degrees and each upward movement caused by shaft spring 331 rotates said shaft 330 clockwise by an additional 30-degrees. Collar 780 has 120-degree bow tie shaped opening 782, to allow said shaft tabs 332 to pass through contacting distal end 466 of legs 462 of driver 460 compressing said anchor spring 468 and shaft spring 331 to close anchoring system 400. The collar 780 has a solid shelf 784, between said bow tie shaped opening 782, of approximately 60-degrees which is pushed downward by said shaft 330 distal tabs 332 when compressing said grasper spring 750 which compresses needle spring 650 first allowing said shaft tabs 332 to drive a straight hollow tube 613 fixedly attached to pusher 640 mount 646 of said needle piercing system. As pusher 640 comes to a stop shaft 330 pushes collar 780, with attached flexible wire 711 end 730, in slot 786, and compresses grasper spring 760 to extend said suture grasping system 700 sequentially.

Figure 4A:
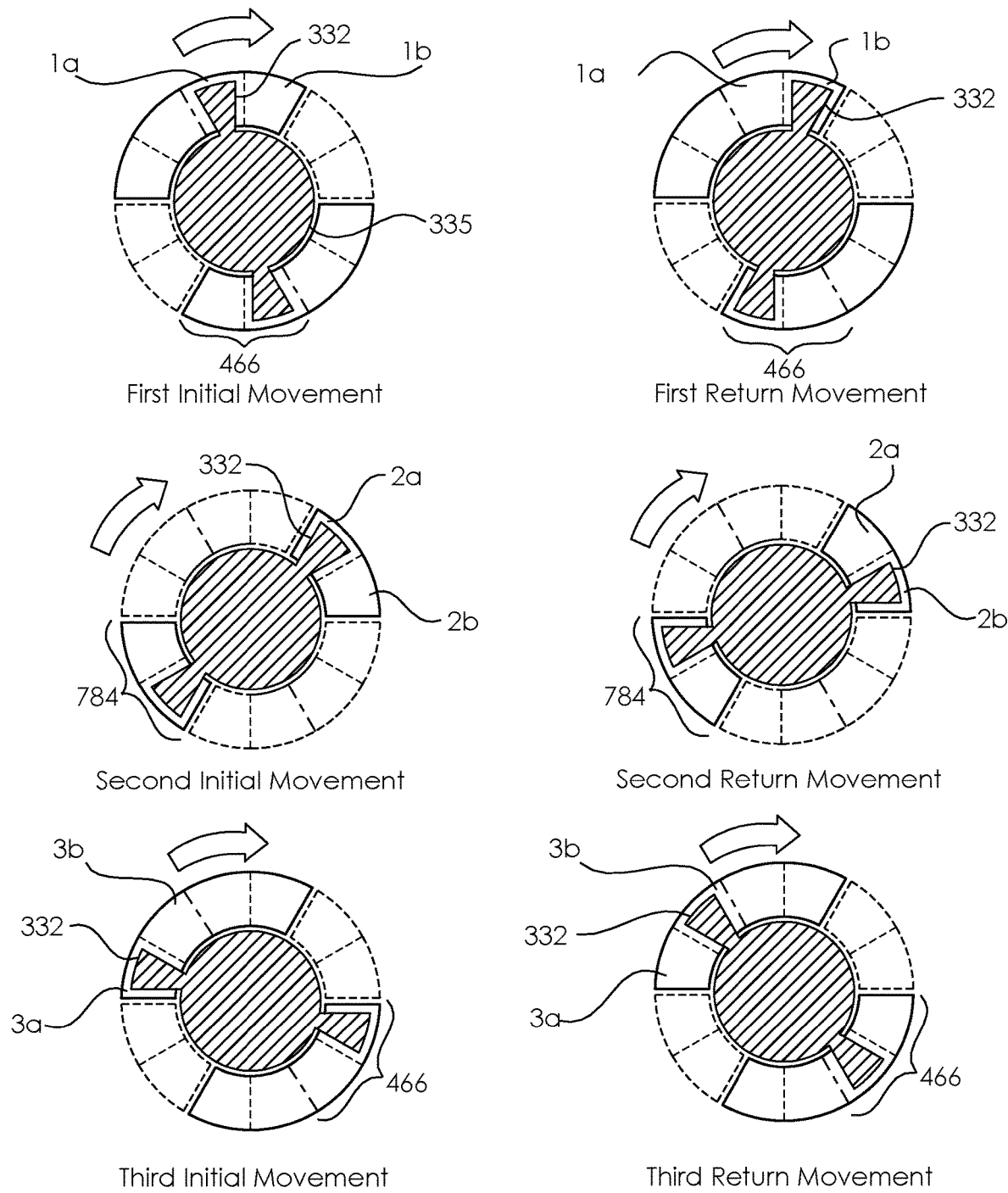
FIG. 4a: is a top view cross-section showing six sequential tab positions.

FIG. 4a is a top view cross-section to clarify sequential functions of 30-degree increments into 60-degree segments completing down and up strokes which are 180-degree mirrored to coincide with symmetrical fins 332. Starting at 1 a of the proximal end 466 of legs 460 comprising four 20-degree increments a First Initial Movement, first stroke, shows tabs 332 in an initial increment 1 a ready to close the anchor system. First Return Movement, second stroke, shows tabs 332 in a second increment 1b of proximal end 466 after completing said first stroke at said second position ready to reopen said anchor system. Continuing onto 2a Second Initial Movement, third stroke, shows 332 on a shelf 784 initial increment 2a completing said second stroke, using a beginning half stroke to extend needles and remaining half stroke to extend said flexible wire angled hook to grasp suture. Second Return Movement, fourth stroke, shows 332 in a shelf 784 second increment 2b completing said second down stroke to begin in reverse order to commence retracting said flexible wire angled hook with captured suture into said needle and then retracting said needle and said suture into said angled channel. Third Initial Movement, fifth stroke, shows 332 in a third increment 3a of a proximal end 466 completing said fifth stroke ready to close said anchor system for withdrawal from said patient wound. Third Return Movement, sixth stroke, shows 332 in a final increment 3b of proximal end 466 upon completing said sixth stroke ready to reopen said anchor system after withdrawal from said patient wound. Upon completion of a full circle rotation, tabs 332 return to said First Initial Movement, to repeat said first stroke, which shows 332 back to at said original position 1a on proximal end 466 shown in said initial increment ready to repeat for multiple use completing 360-degrees of travel.

Figure 5:
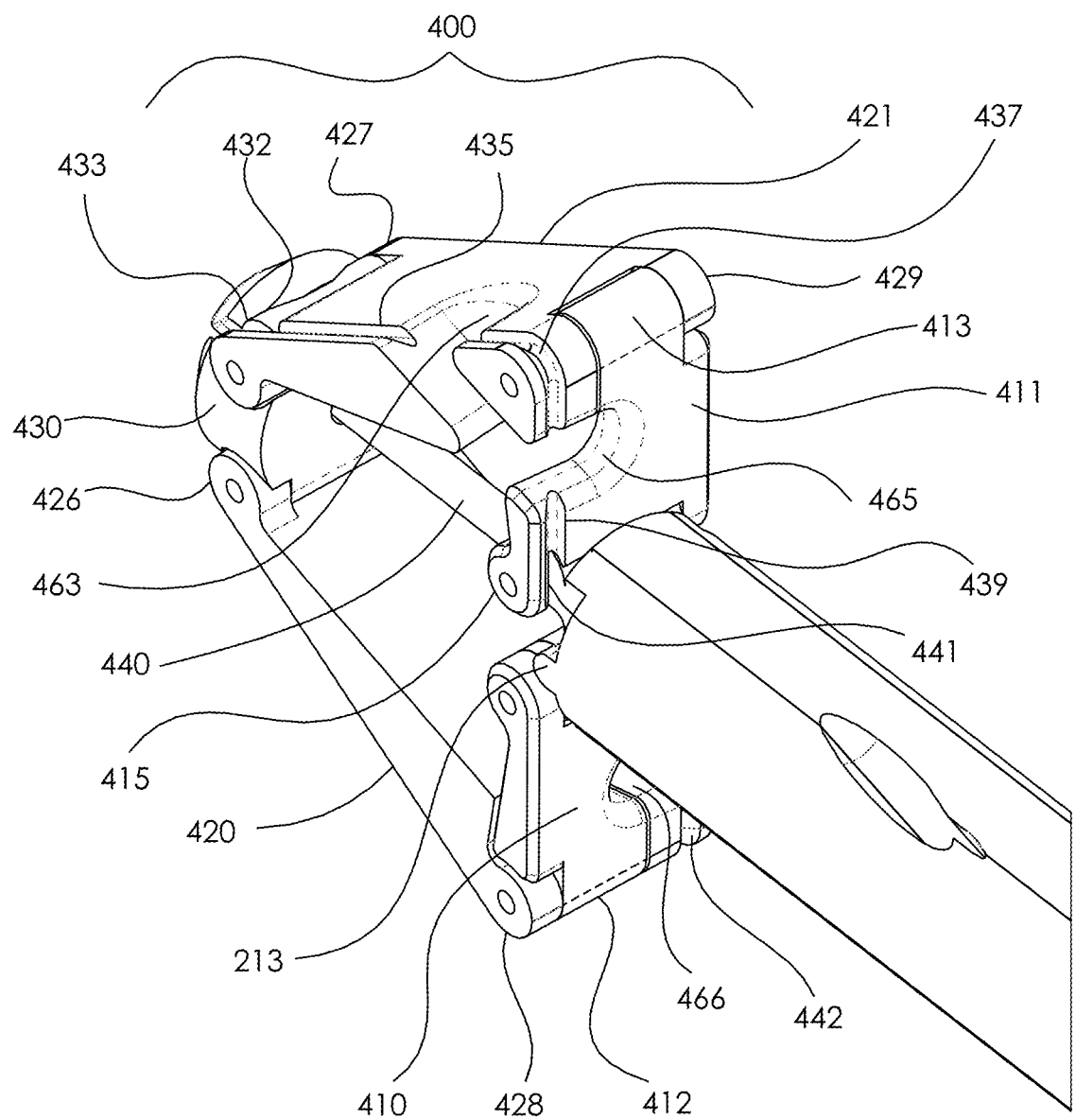
FIG. 5 shows the close-up view of the distally located anchoring system.

FIG. 5 shows the perspective view close-up of the anchoring system 400 a normally open triangular shaped position. In said open position said upper wing 410 is perpendicular to the longitudinal axis of said device 100 while said lower wing 420 is at an acute angle to said longitudinal axis. The peritoneum surface will make intimate contact with said upper wing 410, 411, to set the proper position of said novel invention 100 in respect to said peritoneum. Said anchoring system 400 is comprised of a hinge means shown as knuckles and pins, but not limited to knuckles and pins, allowing the following components to pivot starting distally: distal end cap 430, with a hinge means 432, lower wing 420, 421, with a hinge means 426, 428; upper wing 410, 411, with a hinge means 412, 414, 413, 415, 427, 429, 433, 437, 441, 442; and center distal end 450 with a hinge means 432. Said anchoring system 400 is activated by said drive rod 440 attached to said distal end 430 which is pivotally attached to said lower wings 420, 421, and upper wings 410, 411, to open and closed said anchoring system 400. Said wings having suture routing grooves 435, and 439 to place suture across gap 463 and 465 then turning at 213 to follow suture pathways along said body 211. Anchoring system 400 is rotationally symmetrical about the longitudinal axis of said device 100 therefore, suture routing pathways are replicated on the non-visible side of lower wing 420 and partially hidden view of upper wing 410.

Figure 6:
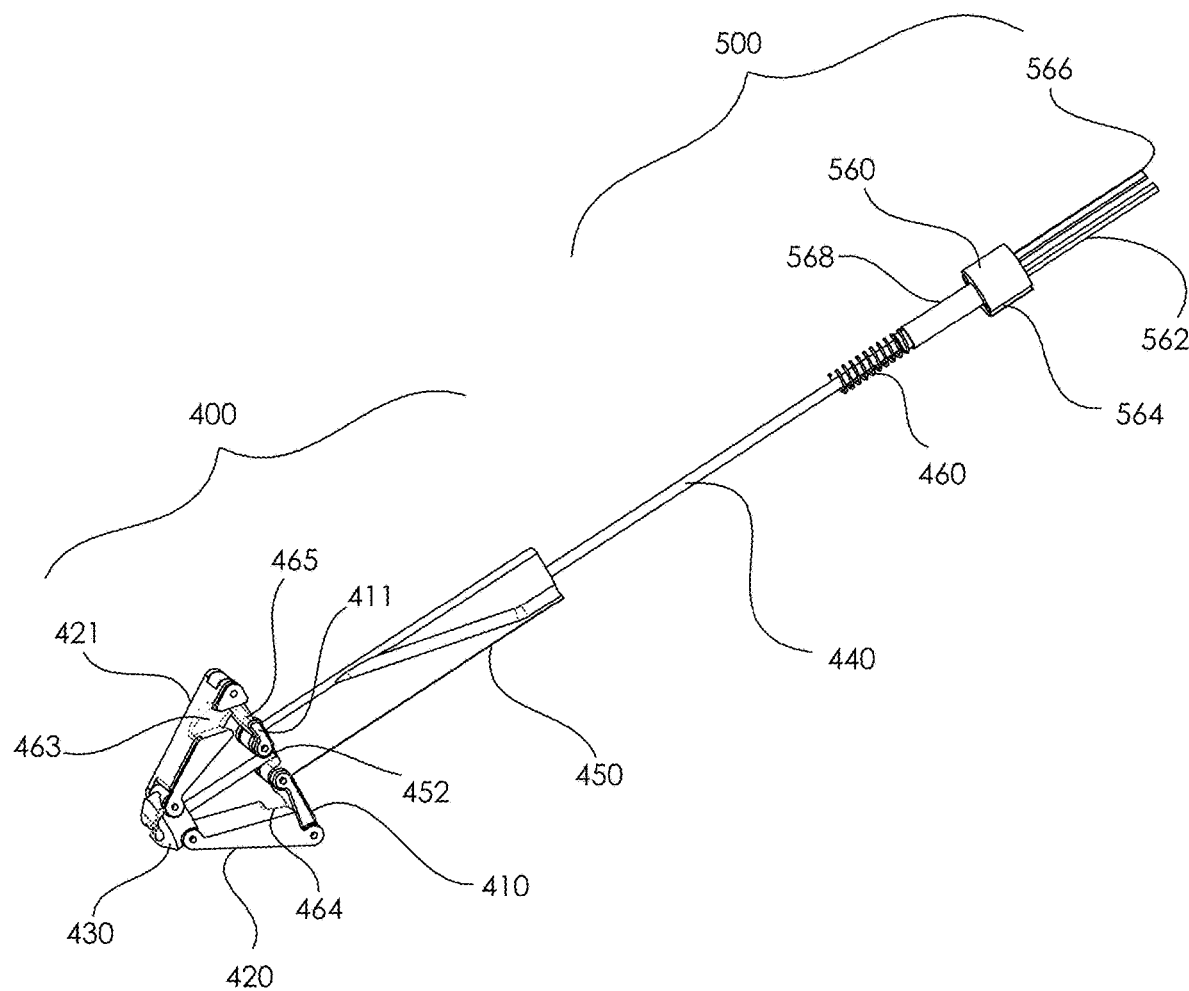
FIG. 6 shows the overall anchoring system components.

FIG. 6 is an isometric view of the anchoring system 400 having a proximal end 466 that interacts with the selector system 300. The distal end of driver 460 is fixedly attached to the proximal end of said rod 440. Said driver 460 has two proximal legs 462, and distally mates with an anchor spring 468 to return anchor system 400 to a normally open triangular position as shown. When said rod 440 is pulled by said anchor spring 468 said end cap 430 moves proximally and said pivot points allowing said anchor system 400 to expand into a triangular shape or when pushed distally by said selective system 300 said anchoring system 400 will contract to a near parallel position to allow insertion into the surgical wound. Said central distal end 450 attaches to said upper wings 410, 411, and 420, 421, having pivot points and guides for said rod 440 attached to end cap 430 to move along said longitudinal axis. Anchoring system 400 is rotationally symmetrical about the longitudinal axis of said device 100 therefore, suture routing pathways are replicated on the non-visible side of lower wing 420 and partially hidden view of upper wing 410, 411.

Figure 7:
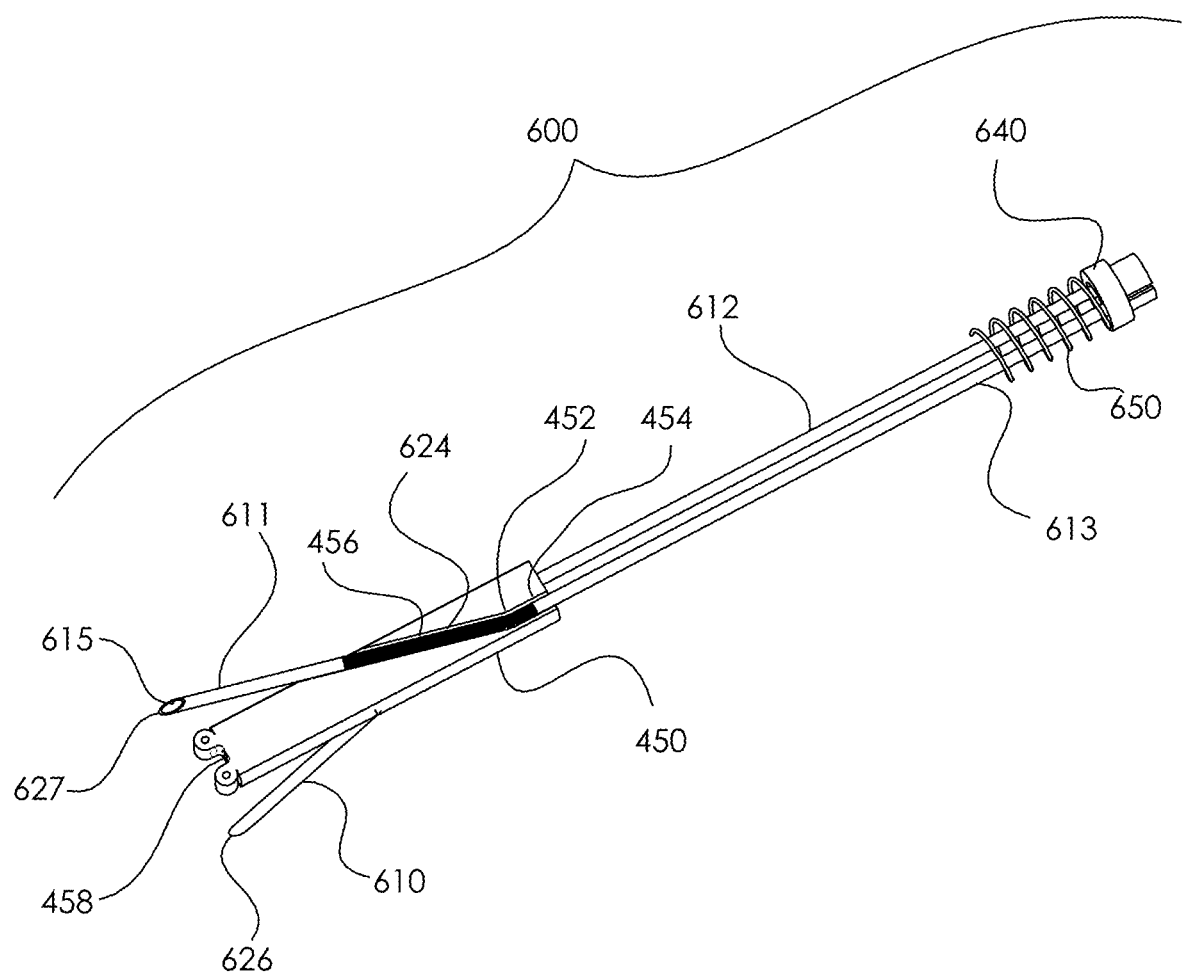
FIG. 7 shows the perspective view of the integrated internal needle piercing system.

FIG. 7 shows the perspective view of the needle piercing system 600. Said needle piercing system 600 is comprised of a sharp hollow point 614, 615, of needles 610, 611, similar but not limited to, a hypodermic needle with the opposite end fixedly attached to a flexible member 624 having near zero compression and near zero elongation properties. Said flexible member 624 is depicted as an extension spring, but not limited to a spring, as other means are available such as, but not limited to, semi-rigid plastics, dead soft malleable metals, memory metal, spring metal strip or spring wire to allow movement as it passes through the bend 452 and straight channel 454. Said flexible member 624 proximal end is attached to a straight hollow tube 612, 613, that is fixedly attached to the pusher 640 which is in contact with a spring 650. Central distal end 450 having an acute angle guide channel 456 to reliably pierce the peritoneum at a sufficient distance from the tissue edge to allow said suture to close said wound without tearing the peritoneum. The peritoneum wall is perpendicular to the elongated axis of said novel invention 100 at the distal flat end 458 of the central distal end 450. Central distal end 450 is rotationally symmetrical about the longitudinal axis of said device 100 therefore, needle channels are replicated on the non-visible side.

Figures 8, 8A:
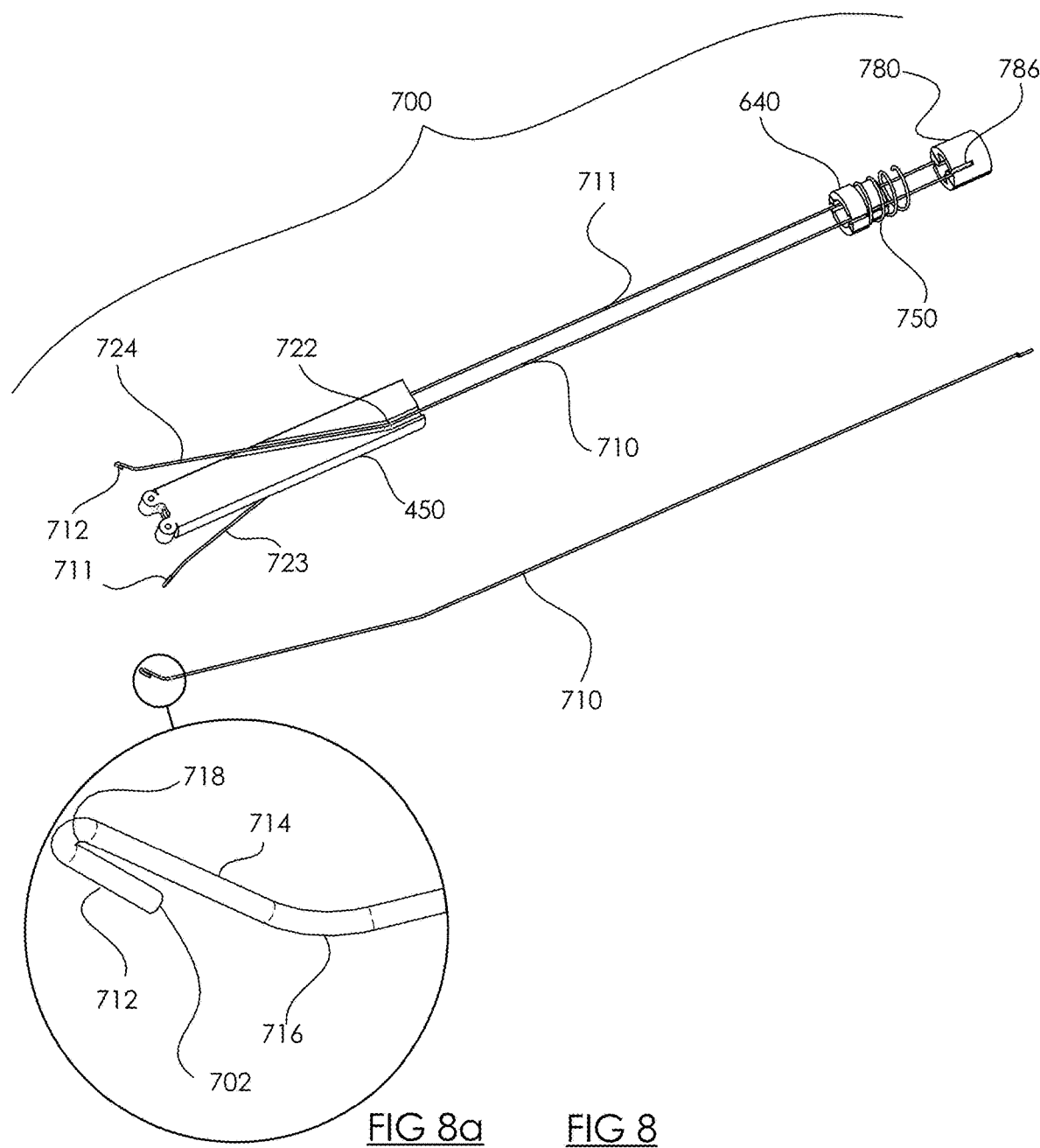
FIG. 8 shows the perspective view of the integrated suture capturing system.
FIG. 8a shows a closeup view of the angled hook.
Figure 9:
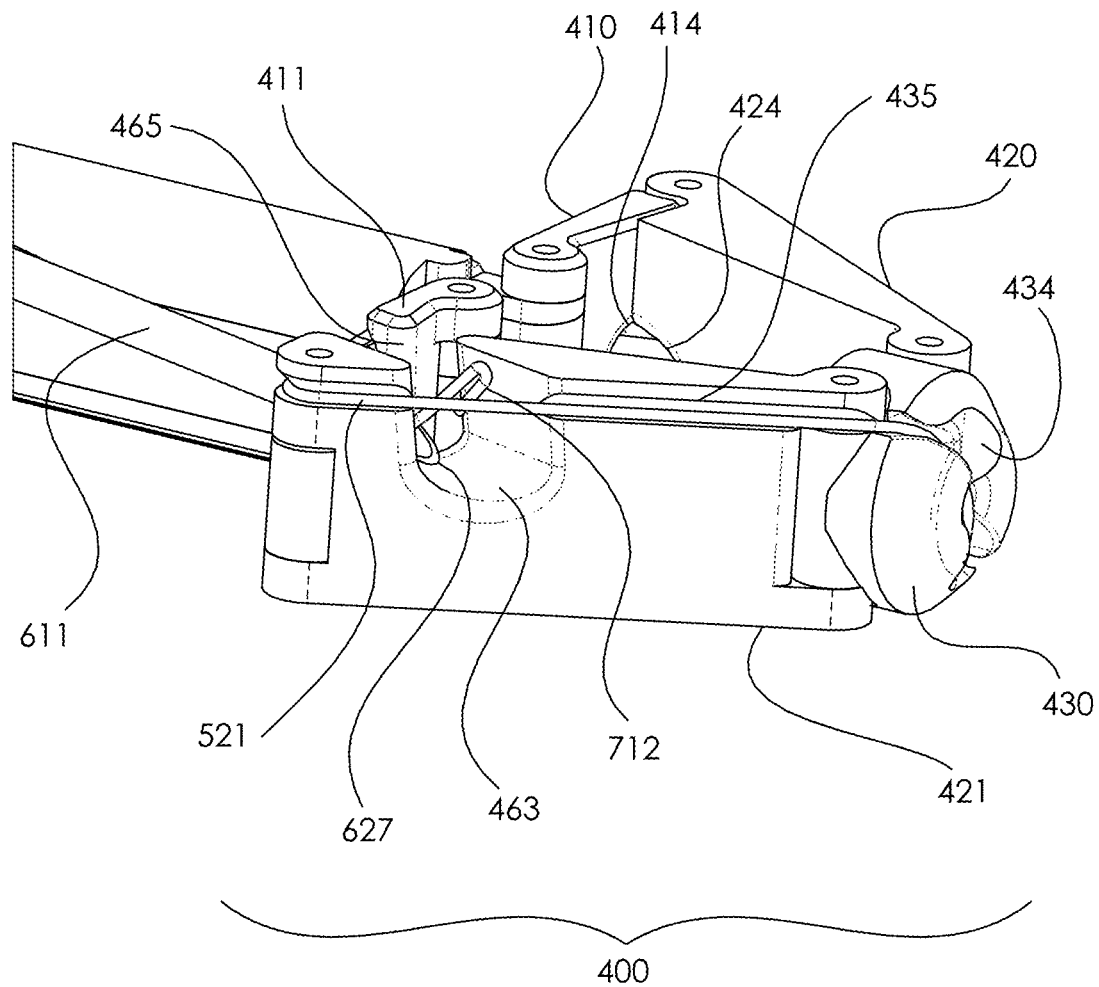
FIG. 9 shows a perspective view of initiating suture contact.

FIG. 8 shows the perspective view of the said suture capturing system 700 having a flexible wire 710, 711, with a proximal end means to firmly attach at a desired location 786 of said collar 780 to resist separation from pulling or pushing. Said spring 750 abuts said pusher 640 to move in unison and controls when said suture capturing system 700 may extend or retract said flexible wire 710 having a distal end hook 712 formed at a bend 716 with an angle set by a bent leg 714 at an angle such that said distal end hook 712 ramps said suture downward passed a hook end 702 for capture within a bend 718 formed opening. Said flexible wire 710, 711, resides inside said needles of said piercing system 600 and conforms to said needles having a bend 722 and distal section 723, 724, central distal end 450 is rotationally symmetrical about the longitudinal axis of said device 100 therefore, said flexible wire follows channels replicated on the non-visible side FIG. 9 shows a perspective view of said anchoring system 400 initiating suture contact by extending said hook 712 beyond said sharp distal end 615. Due to the orientation and position of said suture 521 held in said groove 435 across the span 463, 465, said suture 521 lies at the mid contact point of said hook 712. Said lower wing 420, 421 and upper wing 410, 411, have grooves aligned span openings 424, 414, to allow said needle 611 distal end 615 to enter said triangle shape. As described earlier, when said suture 530 is held in said trough 434 of said end cap 430 said trough 434 aligns said suture 530 to follow said grooves 435, (shown) 424 in the lower wing 420, 421, and grooves in the upper wing 410, 411. Anchoring system 400 is rotationally symmetrical about the longitudinal axis of said device 100 therefore, suture routing pathways are replicated on the non-visible side of lower wing 420 and partially hidden view of upper wing 410, 411.

Figure 10:
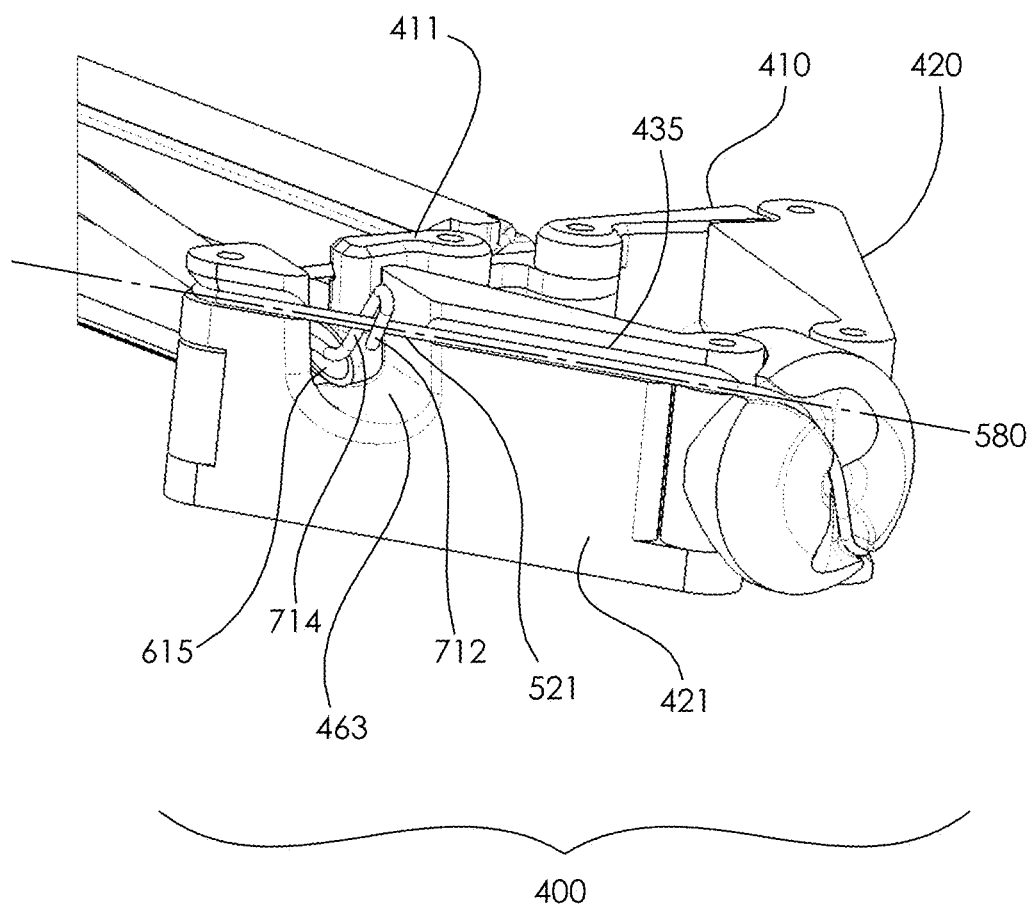
FIG. 10 shows a perspective view of suture being engaged.

FIG. 10 shows a perspective view of the suture capture means of anchoring system 400 as said suture 521 becomes engaged by said suture grasping hook 712 formed in a U shape at an acute angle opening of at least-5-degrees, held at an angle by said leg 714. Said leg 714 allows said hook 712 to pass over said suture 521 being held in place by groove 435 of said lower wing 421. After said hook 712 passes through said span 463 extending beyond said suture span 521, will by force of said angle slip under said hook 712 and against said angled leg 714 whereby suture returns to its' original plane 580 along said groove 435 as shown. Anchoring system 400 is symmetrical about the longitudinal axis of said device 100 therefore, suture grasping is replicated on the non-visible side of lower wing 420 and upper wing 410, 411.

Figure 11:
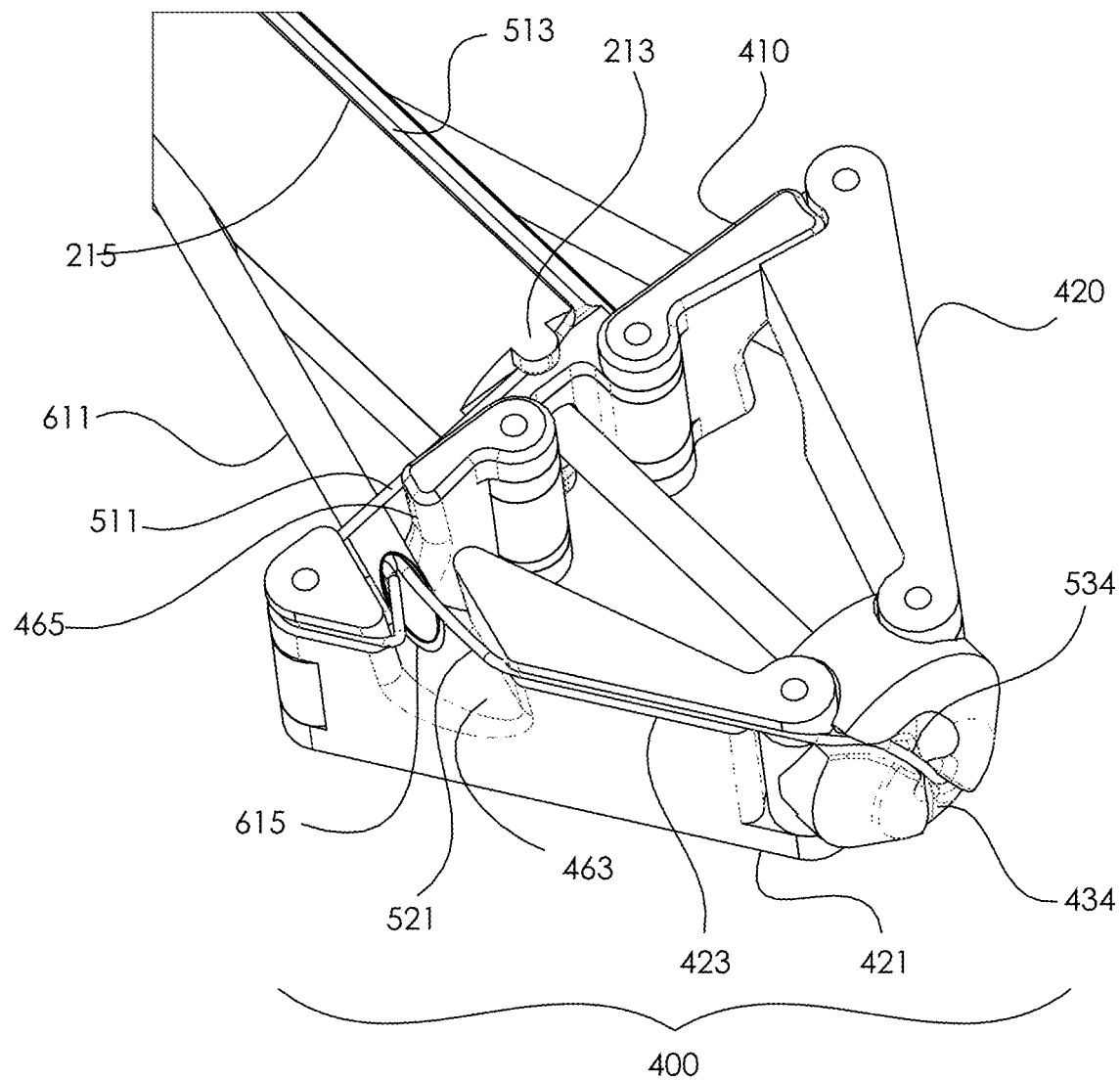
FIG. 11 shows a perspective view of suture being captured and retracted.

FIG. 11 shows a perspective view of suture span 521 as captured and retracted into hollow shape of the said needle 611 by the retracted suture grasper hook 712 (hidden in needle 611). Said suture span 521 is held in place by said groove 435 of said lower wing 421. As said suture span 521 is pulled into a retracted position inside said needle 611 which also retracts into said device 100. Said length of suture 530 drawn in for said capture movement is released by said suture management system 500 pinch ring 562 under tension, further detailed in FIG. 12. Anchoring system 400 is rotationally symmetrical about the longitudinal axis of said device 100; therefore, suture routing pathway and capture means are replicated on the non-visible side of lower wing 420 and partially hidden view of upper wing 410, 411.

Figure 12:
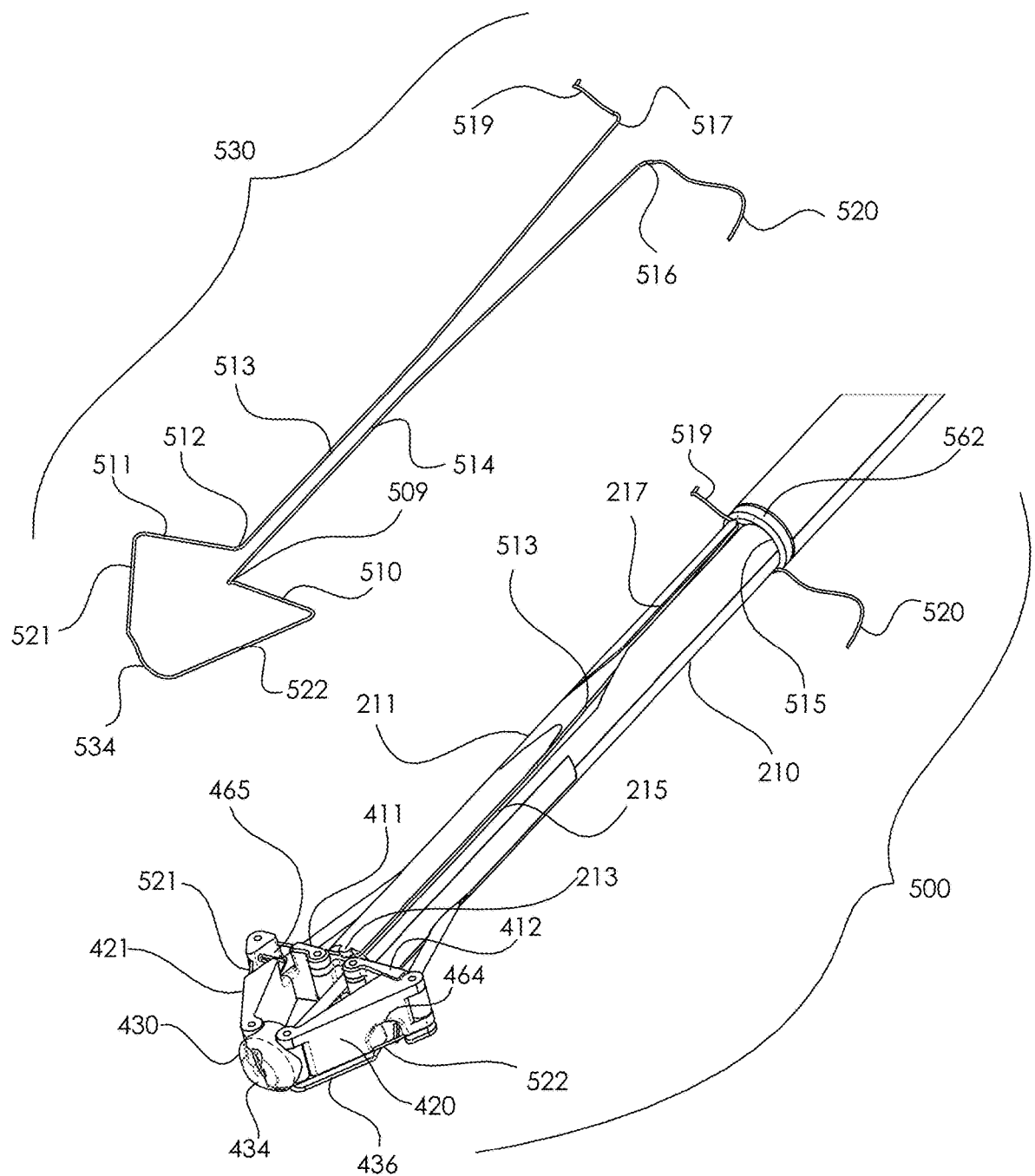
FIG. 12 is an overall view of the suture routing path as staged for a wound closure procedure.

FIG. 12 is an overall view of said suture management system 500 as staged for a wound closure procedure. The upper view shows said suture 530 in a staged configuration without visual obstruction by said novel invention 100 components. Suture 530 has describable shapes related to said body 210, 211, counterparts. Starting at said distal end cap trough 434 corresponds to suture 534; said lower wing grooves on 420, 421, corresponds to suture 521, 522, path; said upper wing grooves on 410, 411, corresponds to 510, 511, suture, said distal tab 213 corresponds to suture bend 5123; said suture track 215 guides suture 514, 515, run; said suture guide 217 controls suture 516, 517, running up to said pinch ring 562 pinch gap 219 which holds suture 518, 519, leaving excess suture tails 520, 521, dangling. Said suture management system 500 is rotationally symmetrical about the longitudinal axis of said body 210 therefore, suture routing pathways are replicated on the non-visible side of 211, lower wing 421, partially hidden view of upper wing 410, 411, distal tab 213, track 215, guide 217 and pinch gap 219.

FIG. 13a-f, is a combination of sequential illustrations on the function of said rigid distal end 611 at the end of said first half of said second stroke, where said sharp distal opening 615 has pierced the peritoneum and stops between said upper wing 411 said span gap 465 and said lower wing 421 span gap 463. Said wire segment 724 will be shown capturing suture 530 specifically by said angled hook 712 hook tip 702 and wire angled leg 714, as it relates to suture span 521. Elements are shown in position near the end of the second half of the second down stroke.

Figure 13A:
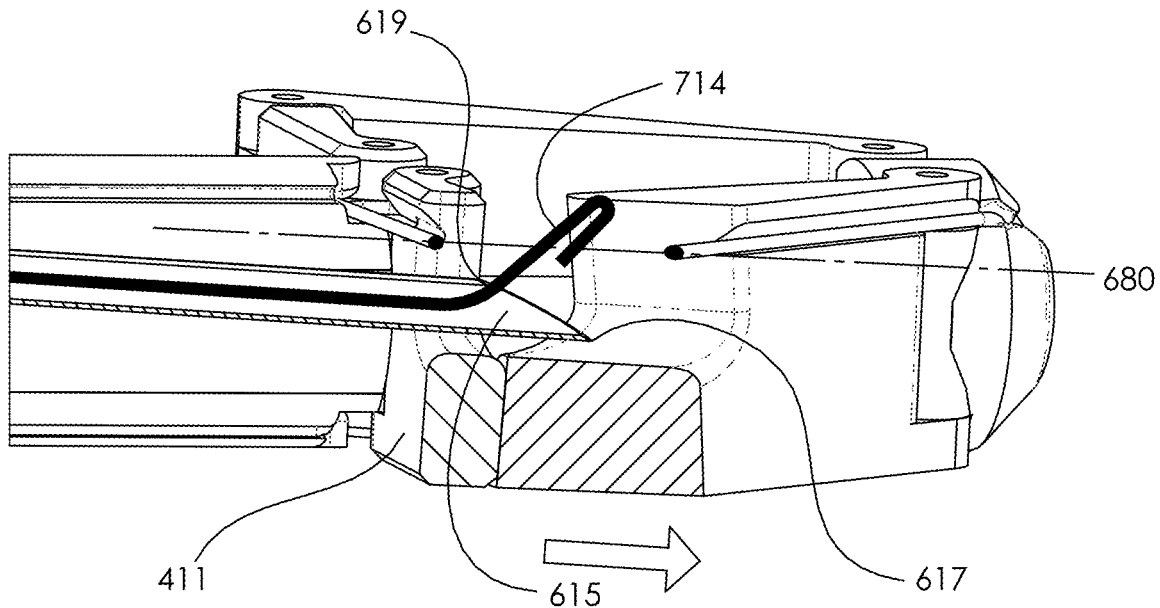
FIGS. 13a, b showing a cross-section of needle and grasper.

FIG. 13a shows a cross-section view of said lower wing 421, wire 710, inside said rigid hollow needle 611 which is below original plane 580 to pierce said peritoneum wall in contact with the surface of said upper wing 411, as said angled hook 712 exits said distal opening 615 toward suture 521 held in place by groove 435 on said original plane 580 to align a mid-contact point on said angled hook 712 by said suture 521 which is spanning said span gap 463 to be captured.

Figure 13B:
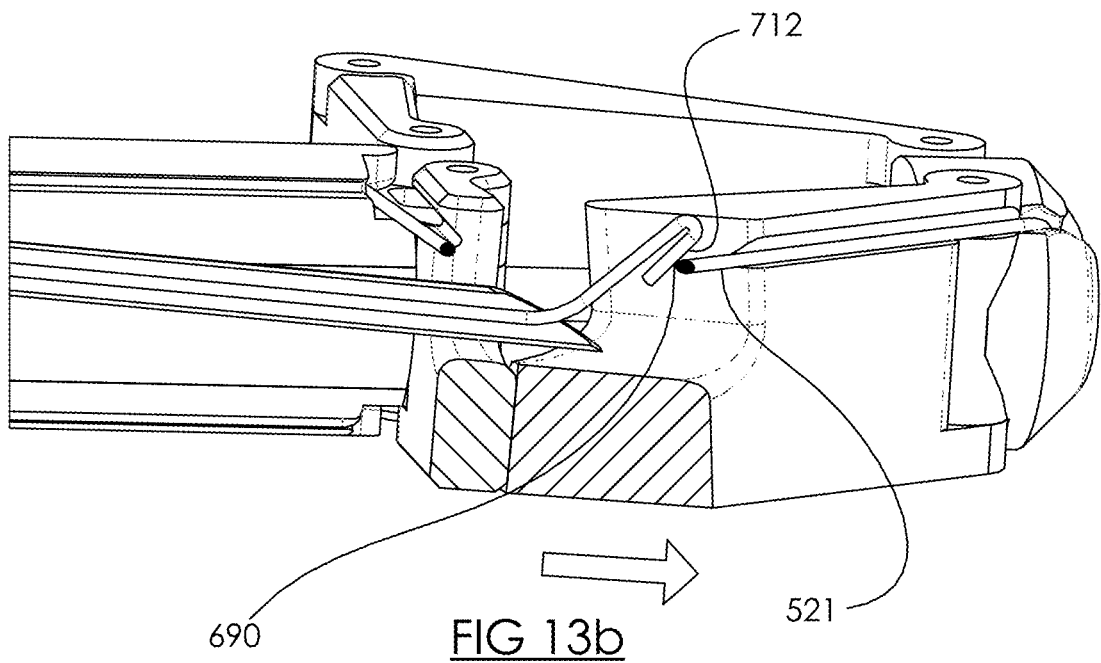
FIGS. 13c, d showing a cross-section of suture capture by a hook.
FIGS. 13e, f showing a cross-section of suture retraction.

FIG. 13b shows a cross-section of said angled hook 712 touching said suture span 521 prior to said angled hook 712 forcing said suture span 521 to flex downward below said original plane 580.

Figure 13C:
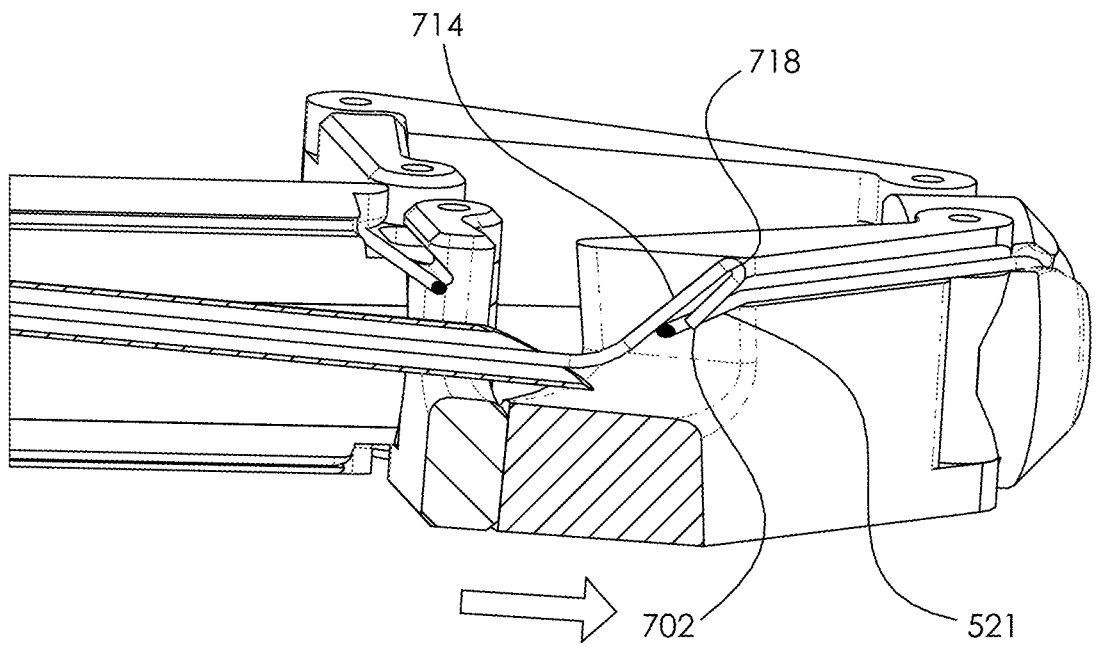

FIG. 13c shows a cross-section of said angled leg 714 passed said suture 521 which has flexed downward beyond said angled end tip 702 below said original plane 580, and due to the suture under tension has returned against said angled leg 714 resting at said hook gap created by bend 718. This is the end of said second down stroke.

Figure 13D:
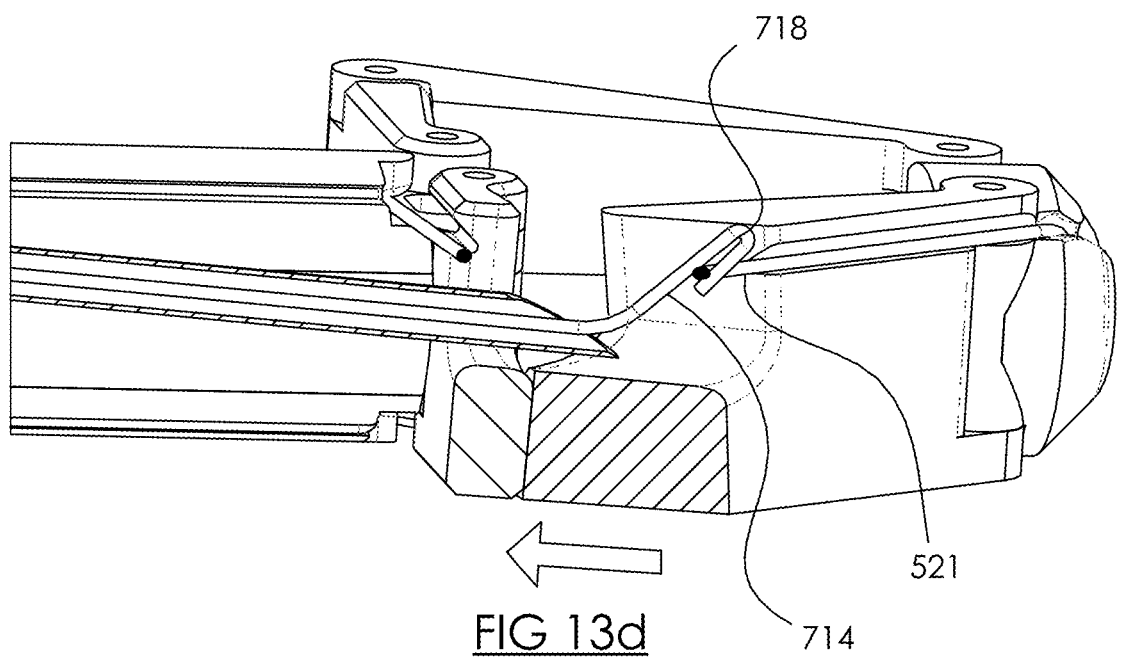

FIG. 13d shows the position of elements as the second up stroke begins in a cross-section view of said angled leg 714 with captured suture 521 returning to said original plane 580 inside said angled hook gap formed by bend 718.

Figure 13E:
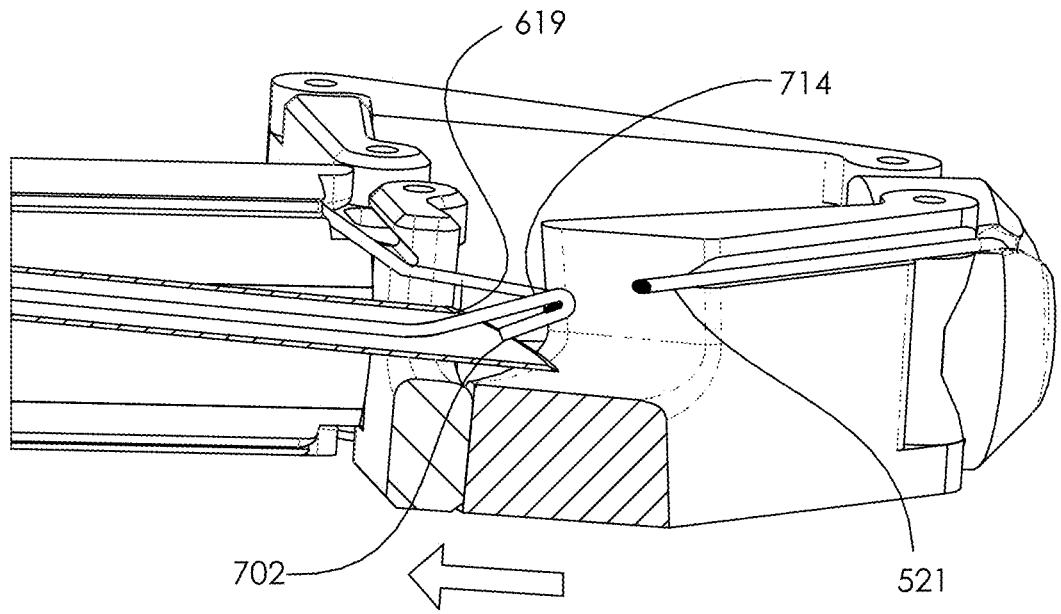

FIG. 13e shows a reverse movement of said angled leg 714 as it begins to retract inside rigid distal end 615 along with captured suture 521 moving below original plane 580 at the first half of said second up stroke.

Figure 13F:
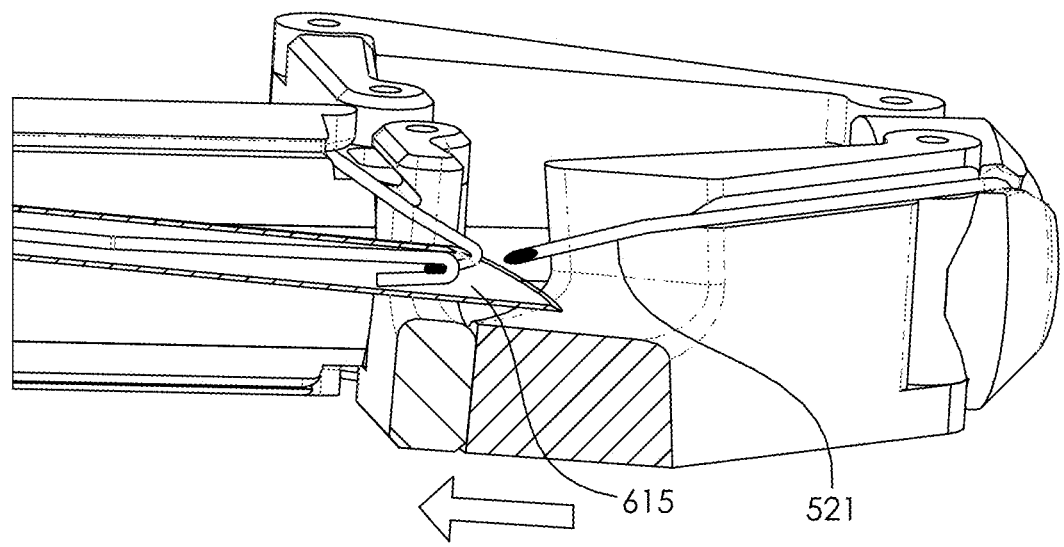

FIG. 13f shows the complete retraction of said suture 521 extended below original plane 580 with angled hook 712 inside said rigid distal end 615 completing said first half of said second up stroke.

What is claimed is:

1. An integrated closure device suitable for closing laparoscopic wounds able to route and retain suture comprising:
    an elongated body having a proximal end and a distal end with distal pivoting members, said distal pivoting members comprising suture pathways configured to stage suture;
    a plurality of hollow needles;
    a single proximal sequential activation means operating at least three functions, said single proximal sequential activation means comprising a rotatable selector;
    wherein said single proximal sequential activation means configured to operate by a repeatable movement comprising an initial movement and return movement;
    wherein said rotatable selector configured to perform index rotation by incrementally indexing said repeatable movement to align with a function of said at least three functions;
    wherein an index rotation amount is a circle divided by the number of functions;

wherein said elongated body having at least one inner channel guide for at least one needle of said plurality of hollow needles;

wherein said distal pivoting members are normally in an expanded configuration;

wherein a first of said initial movement is configured to contract said distal pivoting members to enter a patient wound;

wherein a first of said return movement is configured to expand said distal pivoting members to prevent accidental wound exit;

wherein a beginning half of a second of said initial movement is configured to extend at least one of said plurality of hollow needles, and wherein a returning half of said second of said initial movement is configured to extend a suture capture hook within said at least one needle of said plurality of hollow needles to capture suture in succession;

wherein a beginning half of a second of said return movement is configured to retract said captured suture into said at least one needle of said plurality of hollow needles, and wherein a remaining half of said second of said return movement is configured to then retract said at least one needle of said plurality of hollow needles in succession;

wherein a third of said initial movement is configured to contract said distal pivoting members;

wherein a third of said return movement is configured to return said distal pivoting members to its normally expanded configuration again; and wherein said integrated closure device is configured to be withdrawn from a wound to allow released suture to be tied by a surgeon.

2. An integrated closure device as in claim 1 whereby said suture pathways allow near zero suture length change whether said distal pivoting members are expanded or contracted.

3. An integrated closure device as in claim 1 whereby a pinch ring is configured to retain suture ends of said suture in tension by friction.

4. An integrated closure device as in claim 1 whereby said integrated closure device can be re-used multiple times per patient.

5. An integrated closure device as in claim 1 whereby said plurality of hollow needles are each composed of a rigid sharp distal end and a flexible elongated member at their respective proximal end.

* * * * *